US012250350B2

(12) United States Patent
Mihira

(10) Patent No.: US 12,250,350 B2
(45) Date of Patent: *Mar. 11, 2025

(54) REMOTELY CONTROLLING A POWER SUPPLY OF AN IMAGE FORMING APPARATUS

(71) Applicant: CANON KABUSHIKI KAISHA, Tokyo (JP)

(72) Inventor: Yoshiro Mihira, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

This patent is subject to a terminal disclaimer.

(21) Appl. No.: 16/205,115

(22) Filed: Nov. 29, 2018

(65) Prior Publication Data
US 2019/0149681 A1  May 16, 2019

Related U.S. Application Data

(63) Continuation of application No. 15/490,359, filed on Apr. 18, 2017, now Pat. No. 10,178,256, which is a (Continued)

(30) Foreign Application Priority Data

Jun. 18, 2012 (JP) .................................. 2012-136757

(51) Int. Cl.
H04N 1/00 (2006.01)
(52) U.S. Cl.
CPC ..... *H04N 1/00891* (2013.01); *H04N 1/00209* (2013.01); *H04N 1/00244* (2013.01);
(Continued)

(58) Field of Classification Search
USPC ....................................................... 358/1.13
See application file for complete search history.

(56) References Cited

U.S. PATENT DOCUMENTS

2010/0073703 A1* 3/2010 Tamada ................. G03G 15/80
358/1.14
2010/0231996 A1   9/2010 Todaka
(Continued)

FOREIGN PATENT DOCUMENTS

JP        2007-036318        2/2007

*Primary Examiner* — Eric A. Rust
(74) *Attorney, Agent, or Firm* — VENABLE LLP

(57) ABSTRACT

In an information processing apparatus, when a receiving unit receives data from an external device, a power control unit returns a power state of the apparatus from a power saving state and a transmitting unit transmits a start instruction to a connected image forming apparatus, and when a power supply switch becomes on according to a user's operation, the power control unit returns the power state of the apparatus from the power saving state but the transmitting unit does not transmit the start instruction to the image forming apparatus. Thus, it is possible to achieve both a linkage start and an individual start for an external image processing controller and the image forming apparatus, in an image processing system including the information processing apparatus, the external image processing controller and the image forming apparatus capable of performing an image process in cooperation with others.

28 Claims, 7 Drawing Sheets

Related U.S. Application Data continuation of application No. 14/807,755, filed on Jul. 23, 2015, now Pat. No. 9,667,820, which is a continuation of application No. 13/906,788, filed on May 31, 2013, now Pat. No. 9,118,791.

(52) U.S. Cl.
CPC ..... *H04N 1/00896* (2013.01); *H04N 1/00904* (2013.01); *H04N 2201/0074* (2013.01); *H04N 2201/0091* (2013.01)

(56) References Cited

U.S. PATENT DOCUMENTS

| | | | |
|---|---|---|---|
| 2011/0051189 A1 | 3/2011 | Suga | |
| 2011/0286028 A1 | 11/2011 | Kinouchi | |
| 2011/0310647 A1* | 12/2011 | Humphrey | H02M 3/1584 |
| | | | 363/126 |
| 2013/0229689 A1* | 9/2013 | Bito | H04N 1/32026 |
| | | | 358/1.15 |

* cited by examiner

| 501 | START RECORD | True |
|---|---|---|
| 502 | START INSTRUCTION PC CLIENT IP | 192.168.10.23 |

REMOTELY CONTROLLING A POWER SUPPLY OF AN IMAGE FORMING APPARATUS

This application is a continuation of application Ser. No. 15/490,359, filed on Apr. 18, 2017, which is a continuation of application Ser. No. 14/807,755, filed on Jul. 23, 2015, now U.S. Pat. No. 9,667,820, issued on May 30, 2017, which is a continuation of application Ser. No. 13/906,788, filed on May 31, 2013, now U.S. Pat. No. 9,118,791, issued on Aug. 25, 2015, which claims priority to Japanese Application No. JP 2012-136757, filed Jun. 18, 2012, the contents of each of which are incorporated by reference herein.

BACKGROUND OF THE INVENTION

Field of the Invention

The present invention relates to an image processing system in which an external image processing controller and an image forming apparatus can perform an image process in cooperation with each other.

Description of the Related Art

In recent years, power saving has been needed to an image forming apparatus. Consequently, an active power supply control function has been incorporated in the image forming apparatus. For example, an external power supply off function such as a remote shutdown function or the like for externally turning off the power supply of the image forming apparatus has been provided.

Incidentally, in case of collectively stopping a plurality of devices in units of groups by the remote shutdown function, it is then needed to collectively start the plurality of devices in units of groups. Here, a technique of, in an image processing system in which an image forming apparatus and an image processing controller (print server) are properly combined with each other, collectively starting the image forming apparatus and the image processing controller has been proposed (Japanese Patent Application Laid-Open No. 2007-036318). More specifically, Japanese Patent Application Laid-Open No. 2007-036318 discloses the function of, when a start instruction is transmitted to the external image processing controller, linking and starting the image forming apparatus connected to the external image processing controller.

As described above, heretofore, in a case where a power supply switch is turned on by a user or a power supply start instruction is issued through a network (remote on), it is possible to collectively start the external image processing controller and the image forming apparatus and return the power states thereof from a low power sleep state.

Meanwhile, there is a case where the external image processing controller is used not to perform printing but to perform only a typesetting operation. In this case, there is a use case where only the external image processing controller is turned on.

However, in the existing technique disclosed in Japanese Patent Application Laid-Open No. 2007-036318, since the start instruction is unconditionally issued to the image forming apparatus when the power supply switch of the external image processing controller is turned on, the image forming apparatus is inevitably turned on. For this reason, since it is impossible to achieve the use case as described above, a problem of wasteful power consumption in the unused image forming apparatus occurs.

SUMMARY OF THE INVENTION

The present invention has been completed in order to solve the above problem, and an object thereof is to provide a mechanism capable of achieving, in an image processing system which includes an external image processing controller and an image forming apparatus capable of performing an image process in cooperation with each other, both a linkage start of the external image processing controller and the image forming apparatus and an individual start of each of the external image processing controller and the image forming apparatus.

To achieve the above object, there is provided, in the present invention, an information processing apparatus which is communicably connected to an image forming apparatus and which performs an image process in cooperation with the image forming apparatus, comprising: a receiving unit configured to receive data from an external device through a network; a power supply switch configured to become either an on state or an off state in accordance with an operation by a user; a power control unit configured to, in a case where the receiving unit receives the data from the external device or in a case where the power supply switch becomes the on state in accordance with the operation by the user, return a power state of the information processing apparatus from a power saving state; and a transmitting unit configured to transmit, to the image forming apparatus, a start instruction for starting the image forming apparatus, wherein (1) in the case where the receiving unit receives the data from the external device, the power control unit returns the power state of the information processing apparatus from the power saving state, and the transmitting unit transmits the start instruction to the image forming apparatus, and (2) in the case where the power supply switch becomes the on state in accordance with the operation by the user, the power control unit returns the power state of the information processing apparatus from the power saving state, but the transmitting unit does not transmit the start instruction to the image forming apparatus.

According to the present invention, it is possible to achieve, in the image processing system which includes the external image processing controller and the image forming apparatus capable of performing the image process in cooperation with each other, both the linkage start of the external image processing controller and the image forming apparatus and the individual start of each of the external image processing controller and the image forming apparatus.

Further features of the present invention will become apparent from the following description of exemplary embodiments with reference to the attached drawings.

BRIEF DESCRIPTION OF THE DRAWINGS

FIG. 7 is a flow chart indicating an example of a process which is performed when the start instruction packet is received from a PC client while a main power supply of software to be executed by the CPU 201 of the external image processing controller 101 is being on.

DESCRIPTION OF THE EMBODIMENTS

Hereinafter, preferred embodiments of the present invention will be described with reference to the attached drawings. Here, various constituent elements will be cited in the following description absolutely as examples, and the present invention is by no means limited only thereto.

Figure 1:
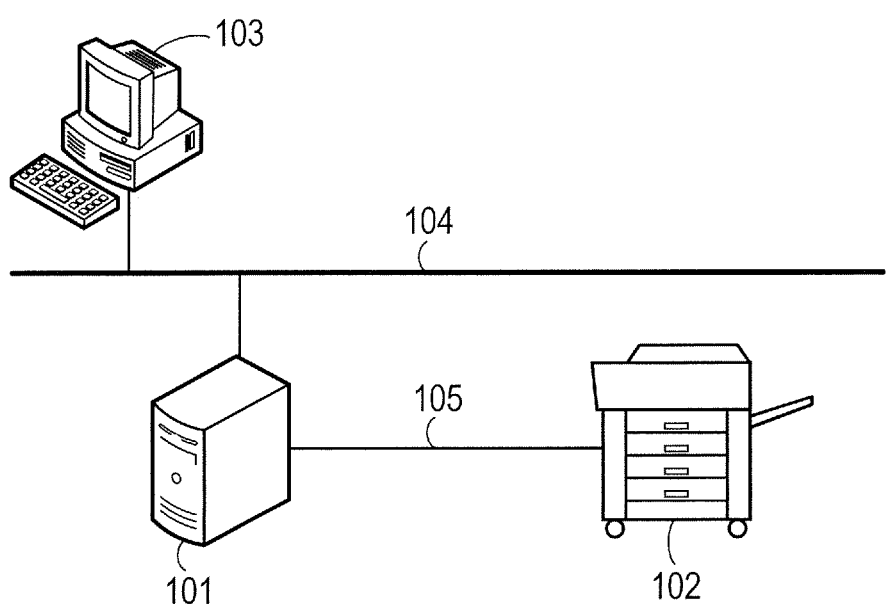
FIG. 1 is a diagram illustrating an example of an image forming system according to an embodiment of the present invention.

FIG. 1 is a diagram illustrating an example of an image forming system according to the embodiment of the present invention.

As illustrated in FIG. 1, the image forming system according to the present embodiment is constituted by an external image processing controller 101 and an image forming apparatus 102. Here, the external image processing controller 101 is the image processing controller which is externally connected to the image forming apparatus 102 communicably through a network 105.

The image forming apparatus 102 is the image forming apparatus which constitutes one image forming system in combination with the external image processing controller 101.

A PC client 103 is connected to a network 104. The PC client 103 can issue a start instruction and a print instruction to the image forming system constituted by the external image processing controller 101 and the image forming apparatus 102, through the network 104.

The network 104 is the network to which the external image processing controller 101 and the PC client 103 are connected. Moreover, the network 104 is the network which achieves LAN connection such as Ethernet or the like.

The network 105 is the network which is used to connect the external image processing controller 101 and the image forming apparatus 102 to each other. Moreover, the network 105 is the network which achieves LAN connection such as Ethernet or the like.

Incidentally, it should be noted that a configuration in which, instead of either one or both of the network 104 and the network 105, another communication medium such as a USB (universal serial bus) cable or the like is used to achieve the above connection is also included in the present invention.

Figure 2:
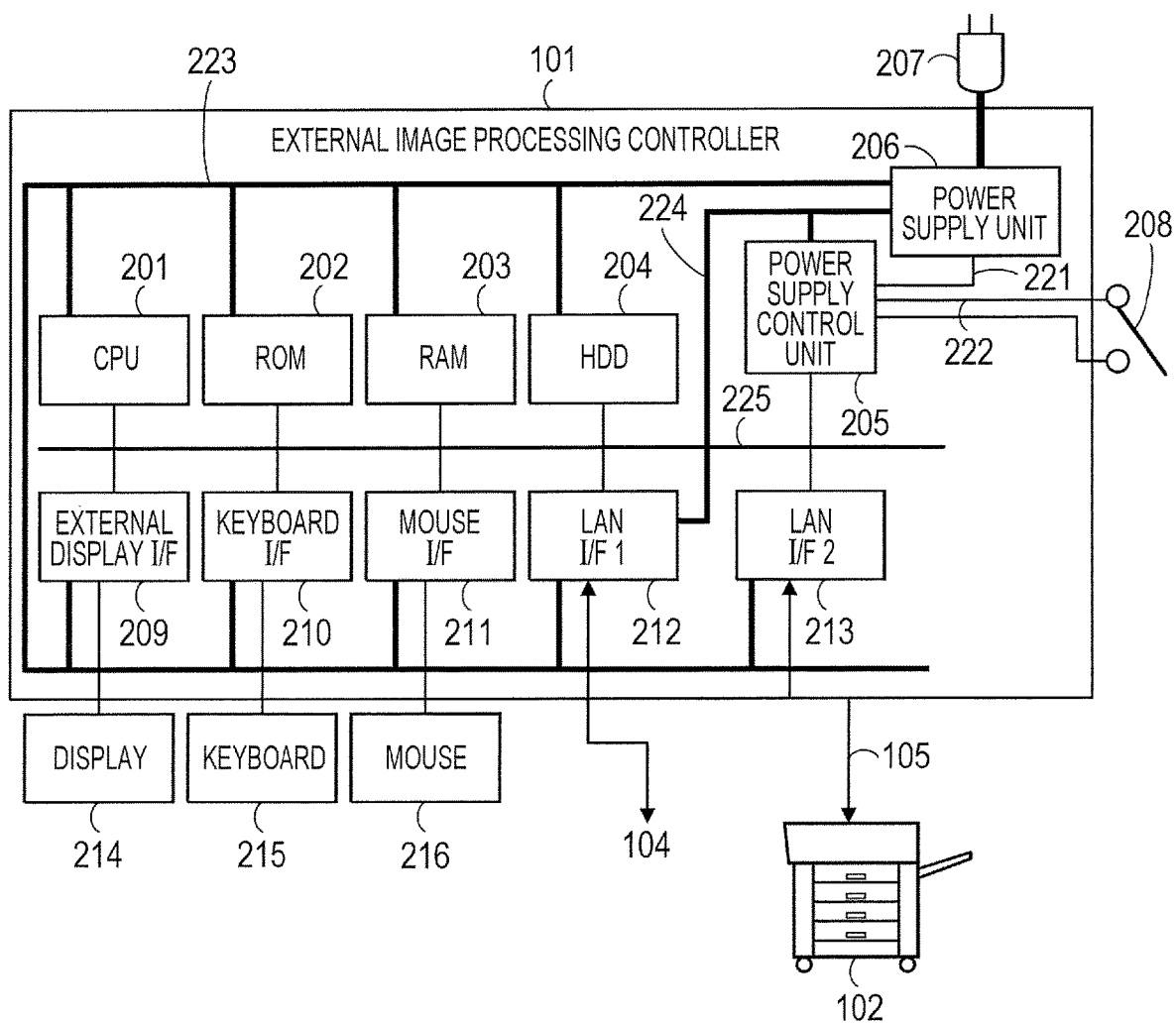
FIG. 2 is a block diagram illustrating an example of a hardware constitution of an external image processing controller 101.

FIG. 2 is a block diagram schematically illustrating an example of a hardware constitution of the external image processing controller 101.

As illustrated in FIG. 2, for example, the external image processing controller 101 includes a CPU 201, a ROM (read only memory) 202, a RAM (random access memory) 203, an HDD (hard disk driver) 204, a power supply control unit 205, a power supply unit 206, a power supply plug 207, a main power supply switch 208, an external display I/F 209, a keyboard I/F 210, a mouse I/F 211, a LAN I/F 1 (212) and a LAN I/F 2 (213).

The CPU 201 performs various processes by reading and executing programs computer-readably stored in the ROM 202 or the HDD 204. The RAM 203 is used as a working area for the CPU 201.

The external display I/F 209 controls a display by a display 214, the keyboard I/F 210 controls an input from a keyboard 215, and the mouse I/F 211 controls an input from a mouse 216.

The LAN I/F 1 (212) is the communication control unit which controls connection between the external image processing controller and the network 104. The external image processing controller 101, which is connected to the network 104 through the LAN I/F 1 (212), can communicate with the PC client 103 serving as an external device. Moreover, the external image processing controller 101 can receive a start instruction and a print job from the PC client 103 through the network 104.

Incidentally, the LAN I/F 1 (212), which is connected to an internal bus 225, can notify through the internal bus 225 the power supply control unit 205 of reception of a start instruction packet transmitted from the PC client 103. Thus, it is possible for the power supply control unit 205 to start the external image processing controller 101 in response to such a start instruction packet reception notification. Incidentally, a unicast packet, a multicast packet or a broadcast packet may be used as the start instruction packet. For example, to collectively start devices on a floor or devices in a building, the multicast packet or the broadcast packet is used as the start instruction packet. Further, to start only a specific device, the unicast packet is used as the start instruction packet.

The LAN I/F 2 (213) controls connection between the external image processing controller and the network 105. The external image processing controller 101, which is connected to the network 105 through the LAN I/F 2 (213), can communicate with the image forming apparatus 102. Thus, the external image processing controller 101 can issue a start instruction and a print instruction to the image forming apparatus 102, through the network 105.

The power supply control unit 205, which is connected to the internal bus 225, can receive the start instruction packet reception notification from the LAN I/F 1 (212) as described above. The power supply control unit 205 is also connected to the main power supply switch 208 through a main power supply switch line 222, and thus can detect depression of the main power supply switch 208 by a user through the main power supply switch line 222. The power supply control unit 205 instructs the power supply unit 206 to enable power supply to a main power supply line 223 by using a power supply unit control line 221, on the basis of the start instruction packet reception notification or detection of the depression of the main power supply switch 208.

The power supply unit 206 performs voltage and DC conversion to AC power supplied from the power supply plug 207, and thereby supplies power to each module through a standby power supply line 224 and the main power supply line 223.

The standby power supply line 224 is the supply line through which power is always supplied. The standby power supply line 224 is the supply line through which power is always supplied to the LAN I/F 1 (212) used to process the start instruction from the network 105 and the power supply control unit 205. Meanwhile, the main power supply line 223 is the main power supply line which is controlled to supply or stop power in response to an instruction transferred from the power supply control unit 205.

The external image processing controller 101 can operate in at least two power states, i.e., a power saving state (first power state) in which power is supplied from the standby power supply line 224 and power is not supplied from the main power supply line 223, and a start state (second power state) in which power is supplied from both the standby power supply line 224 and the main power supply line 223. The external image process controller 101 performs power control by switching the power state from the first power state to the second power state. Incidentally, the main power supply switch 208 is the switch capable of instructing to switch the power state between the first power state and the second power state. Also, a user can switch the power state of the external image processing controller 101 from the first power state to the second power state in response to an instruction transmitted from the PC client 103.

Incidentally, in the present embodiment, the first power state is included in the state that the external image processing controller 101 is not started. That is, to start the external image processing controller 101 implies to return the power state of the external image processing controller 101 from the first power state to the second power state.

The internal bus 225, which is constituted by, e.g., a PCI (Peripheral Components Interconnect) bus or the like, enables data communication among respective modules.

Incidentally, the LAN I/F 1 (212) has a processor, a memory and the like all not illustrated. The processor performs various processes for the LAN I/F 1 (212) by reading and executing programs stored in the memory.

Figure 9:
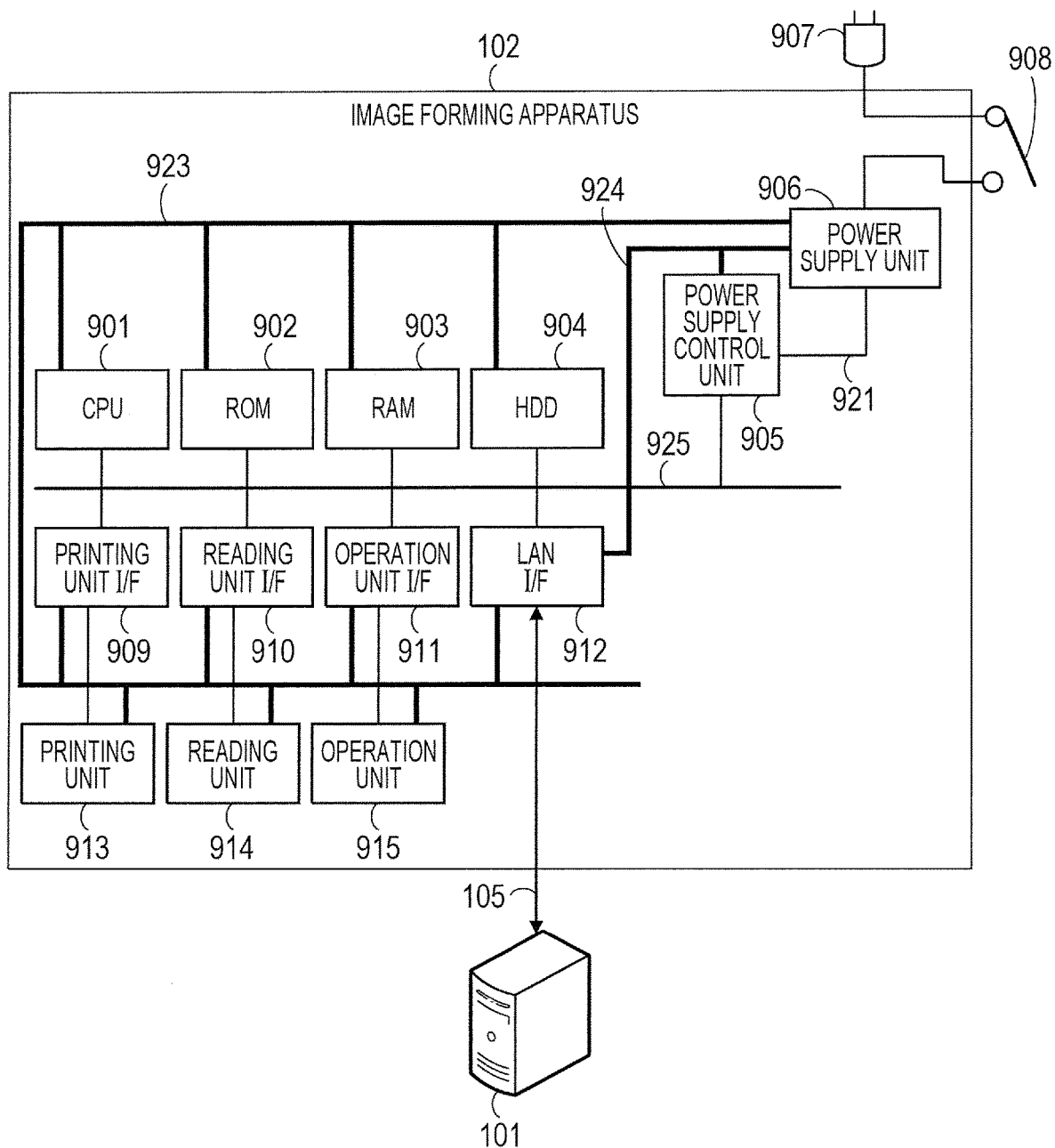
FIG. 9 is a diagram schematically illustrating an example of a hardware constitution of an image forming apparatus 102.

FIG. 9 is a diagram schematically illustrating an example of a hardware constitution of the image forming apparatus 102.

As illustrated in FIG. 9, for example, the image forming apparatus 102 includes a CPU 901, a ROM 902, a RAM 903, an HDD 904, a power supply control unit 905, a power supply unit 906, a power supply plug 907, a body power supply switch 908, a printing unit I/F 909, a reading unit I/F 910, an operation unit I/F 911, a LAN I/F 912, a printing unit 913, a reading unit 914 and an operation unit 915.

The CPU 901 performs various processes by reading and executing programs computer-readably stored in the ROM 902 or the HDD 904. The RAM 903 is used as a working area for the CPU 901.

The printing unit I/F 909 controls the printing unit 913, the reading unit I/F 910 controls the reading unit 914, and the operation unit I/F 911 controls the operation unit 915.

The LAN I/F 912 controls connection between the image forming apparatus and the network 105. The image forming apparatus 102, which is connected to the network 105 through the LAN I/F 912, can communicate with the external image processing controller 101. Moreover, the image forming apparatus 102 can receive a start instruction and a print instruction from the external image processing controller 101 through the network 105.

The power supply control unit 905, which is connected to an internal bus 925, can receive the start instruction from the LAN I/F 912 as described above. The power supply control unit 905 instructs the power supply unit 906 to enable power supply to a main power supply line 923 by using a power supply unit control line 921, on the basis of the received start instruction.

The power supply unit 906 performs voltage and DC conversion to AC power supplied from the power supply plug 907, and thereby supplies power to each module through a standby power supply line 924 and the main power supply line 923. The body power supply switch 908, which is connected between the power supply plug 907 and the power supply unit 906, is used to switch supplying and stopping of the AC power from the power supply unit 906.

The standby power supply line 924 is the supply line through which power is always (when the body power supply switch 908 is on) supplied. The standby power supply line 924 is the supply line through which power is always supplied to the LAN I/F 912 used to process the start instruction from the network 105 and the power supply control unit 905.

Meanwhile, the main power supply line 923 is the main power supply line which is controlled to supply or stop power in response to an instruction transferred from the power supply control unit 905. The main power supply line 923 is controlled to supply the power in a normal mode (start state) and to stop the power supply in a state such as a deep sleep mode in which the apparatus is not started. Thus, it is possible in a power saving mode to suppress the power consumption of the image forming apparatus 102. Incidentally, the deep sleep mode is a kind of power saving mode in the image forming apparatus, and the functional units other than the power supply unit 906, the power supply control unit 905 and the LAN I/F 912 are not started in this mode. In the present embodiment, the deep sleep mode is included in the state that the image forming apparatus is not started, and to start the image forming apparatus implies to return the image forming apparatus from the deep sleep mode to the normal mode.

The image forming apparatus 102 can operate in at least two power states, i.e., the deep sleep mode in which power is supplied from the standby power supply line 924 and power is not supplied from the main power supply line 923, and the start state in which power is supplied from both the standby power supply line 924 and the main power supply line 923.

The internal bus 925, which is constituted by, e.g., a PCI bus or the like, enables data communication among respective modules.

Hereinafter, a software configuration of the external image processing controller 101 will be described with reference to FIG. 3.

Figure 3:
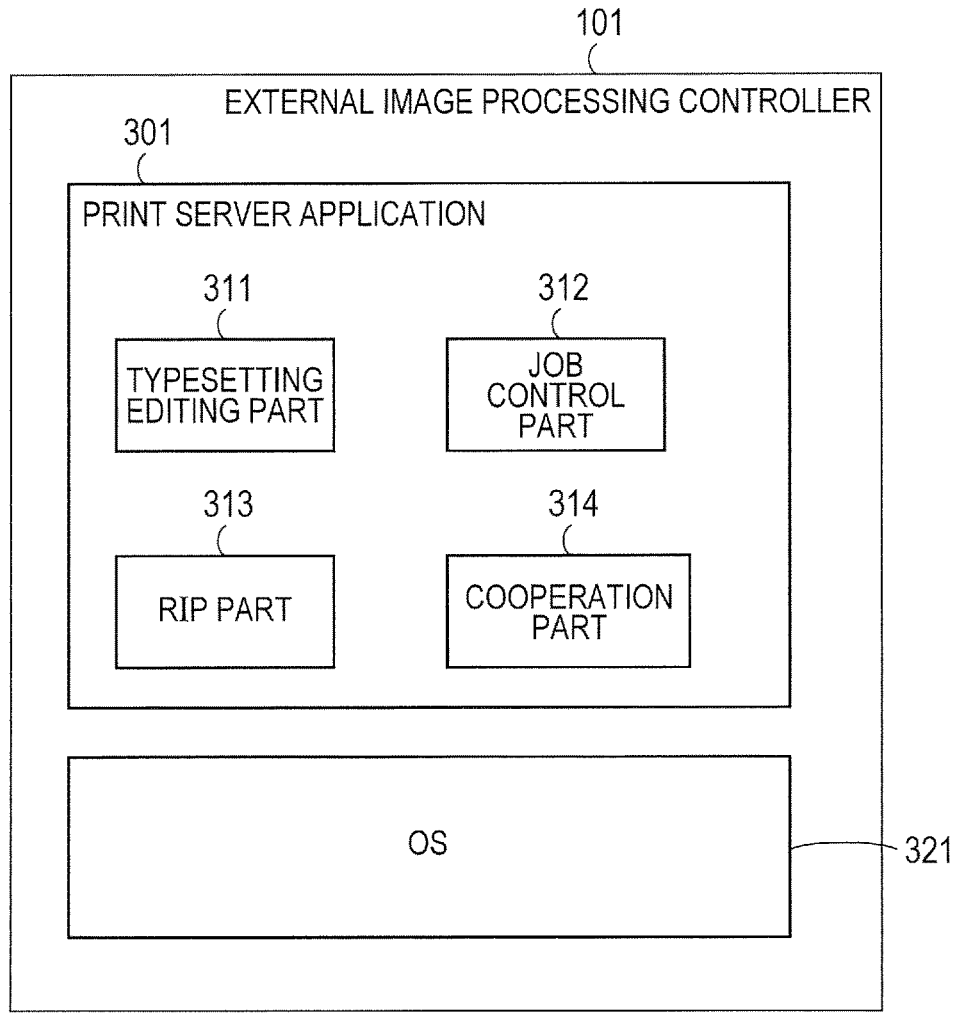
FIG. 3 is a block diagram illustrating an example of a software configuration of the external image processing controller 101.

Namely, FIG. 3 is the functional block diagram illustrating an example of the software configuration of the external image processing controller 101. Incidentally, each software module illustrated in FIG. 3 is achieved when the CPU 201 reads out and executes a program stored in the ROM 202, the RAM 203 and the HDD 204 of the external image processing controller 101.

In FIG. 3, an OS (operating system) 321 is basic software of the external image processing controller 101. A print server application 301 is application software which operates on the OS 321 executed by the CPU 201.

The print server application 301 includes a typesetting (composition) editing part 311, a job control part 312, an RIP (raster image processor) part 313 and a cooperation part 314, and performs various kinds of predetermined processes including an image process.

The typesetting editing part 311 is the editing part which performs a typesetting editing process of editing image data for each page to a bookbinding typesetting (composition) format, on the basis of an instruction from the PC client 103.

The job control part 312 is the control part which controls the print job on the basis of an instruction from the PC client 103. More specifically, the job control part 312 controls reception of print data and the print instruction from the PC client 103, and print order in the print job.

The RIP part 313 is the processing part which performs a conversion process of PDL (page description language) data into a raster image to be printed, when the typesetting editing process is performed by the typesetting editing part 311 or when an actual image forming process is performed by the job control part 312.

The cooperation part 314 is the cooperation part which performs a power supply cooperation control of the cooperating image forming apparatus 102 so that the power supply of the image forming apparatus is turned on in conjunction with turn-on of the power supply of the external image processing controller 101.

Hereinafter, a start process of the external image processing controller 101 according to the present embodiment will be described with reference to FIGS. 4 to 8.

Initially, a reception process of the start instruction packet by the LAN I/F 1 (212) will be described with reference to the flow chart illustrated in FIG. 4.

Figure 4:
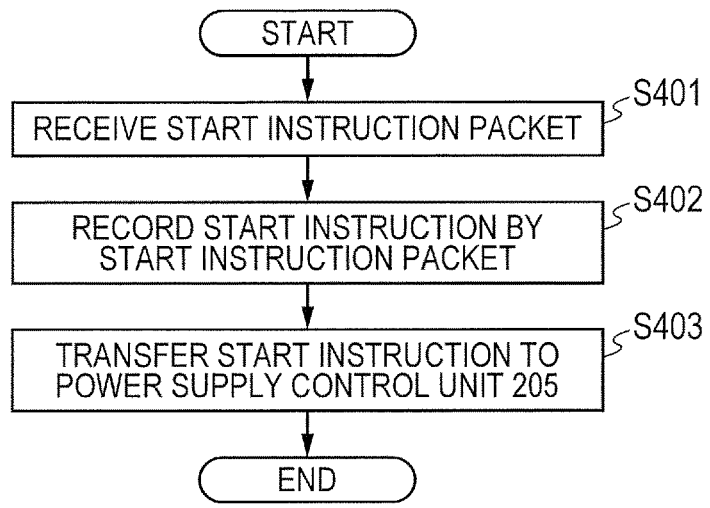
FIG. 4 is a flow chart indicating an example of a reception process of a start instruction packet transmitted from a PC (personal computer) client 103 to a LAN I/F (local area network interface) 1 (212) of the external image processing controller 101.

Namely, FIG. 4 is the flow chart indicating an example of the reception process of the start instruction packet transmitted from the PC client 103 to the LAN I/F 1 (212) of the external image processing controller 101.

Incidentally, the process in the flow chart is achieved when the processor in the LAN I/F 1 (212) reads out and executes the program stored in the memory of the LAN I/F 1 (212). When the process in the flow chart is performed, the external image processing controller 101 is in the state that the main power supply switch 208 is off and the main power supply is off. As described above, even in the state that the main power supply is off, since the power is always supplied from the standby power supply line 224, the LAN I/F 1 (212) is in the operable state (first power state).

Initially, when the start instruction packet transmitted from the PC client 103 is received by the LAN I/F 1 (212) (S401), the process is advanced to S402.

In S402, the information (start record) indicating that there is the start instruction by the start instruction packet and the IP (Internet Protocol) address of the PC client from which the start instruction packet was received are recorded, as a record of the start instruction, in the memory of the LAN I/F 1 (212). Here, a concrete example of the record contents of the start instruction is illustrated in FIG. 5.

Figures 5, 6:
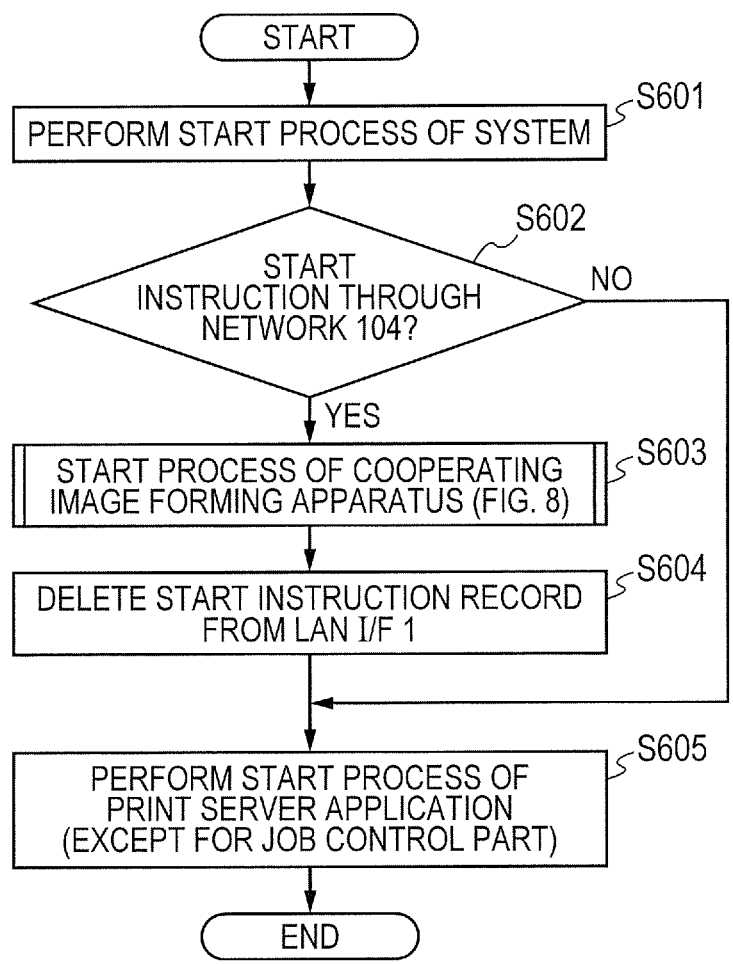
FIG. 5 is a diagram illustrating an example of record contents of a start instruction to be recorded in a memory of the LAN I/F 1 (212).
FIG. 6 is a flow chart indicating an example of a process which is performed when software to be executed by a CPU (central processing unit) 201 of the external image processing controller 101 is started.

Namely, FIG. 5 is the diagram illustrating an example of the record contents of the start instruction to be recorded in the memory of the LAN I/F 1 (212).

As illustrated in FIG. 5, the record of the start instruction includes a start record 501 and a start instruction PC client IP 502.

When the start instruction is issued by receiving the start instruction packet (in the case of FIG. 4), "True" is recorded as the start record 501 by the LAN I/F 1 (212). On the other hand, when the start instruction is not issued by the start instruction packet, "False" is recorded as the start record 501.

Further, the IP address of the PC client 103 is recorded as the start instruction PC client IP 502 by the LAN I/F 1 (212).

Hereinafter, the description returns to the flow chart illustrated in FIG. 4.

Next, in S403, the start instruction (start instruction packet reception notification) is transferred from the LAN I/F 1 (212) to the power supply control unit 205 through the internal bus 225. Then, on the basis of the start instruction packet reception notification, the power supply unit 206 is instructed by the power supply control unit 205 to supply the power to the main power supply line 223 of the external image processing controller, and the external image processing controller 101 is started and activated. Thus, the external image processing controller 101 comes to be in the second power state.

Subsequently, a process which is performed when software to be executed by the CPU 201 will be described with reference to FIG. 6.

Namely, FIG. 6 is the flow chart indicating an example of the process which is performed when the software to be executed by the CPU 201 of the external image processing controller 101 is started.

Incidentally, the process in the flow chart corresponds to the process which is performed after the power supply to the main power supply line 223 is started based on the start instruction (start instruction packet reception notification) in S403 of FIG. 4 and thus the process of the CPU 201 is started. Further, the process in the flow chart is achieved when the CPU 201 reads out and executes a program stored in the ROM 202, the RAM 203 or the HDD 204.

Initially, in S601, a start process of the OS 321 is performed by the CPU 201. When the start process of the OS 321 is completed, an initialization and start process of the cooperation part 314 of the print server application 301 is performed by the CPU 201.

Next, in S602, the CPU 201 judges in the cooperation part 314 whether or not the power-on based on the start instruction this time has been performed through the network. More specifically, the CPU 201 checks and sees the value recorded as the start record 501 of FIG. 5 held in the memory of the LAN I/F 1 (212), through the internal bus 225. When the start instruction has been transferred through the network, "True" has been recorded as the start record 501 held in the memory of the LAN I/F 1 (212) in S402 of FIG. 4.

Consequently, when "True" has been recorded as the start record 501, it is judged by the CPU 201 that the start instruction has been transferred through the network (YES in S602), and the process is advanced to S603.

On the other hand, when "False" has been recorded as the start record 501, it is judged by the CPU 201 that the start instruction is based on the depression of the main power supply switch 208 (that is, the start instruction has not been transferred through the network) (NO in S602), and the process is advanced to S605.

In S603, the start process of the cooperating image forming apparatus 102 is performed by the CPU 201. The detail of this process will be separately described with reference to FIG. 8.

Further, in S604, since the start process was performed, the value of the start record 501 set in S402 of FIG. 4 is returned to "False" by the CPU 201 (deletion (erasure) of the start instruction record). Incidentally, in S604, since there is a possibility that the value of the start instruction PC client IP 502 is used in a later-described start instruction success/failure notification process (S806 and S807 in FIG. 8), the relevant value is continuously held. Then, the process is advanced to S605.

In S605, the initialization and start process is performed by the CPU 201 to, among the functions of the print server application 301, the function(s) usable even if the cooperating image forming apparatus 102 is not started yet. More specifically, the initialization and start process is performed by the CPU 201 to, among respective module processing parts of the print server application 301, the typesetting editing part 311 and the RIP part 313. That is, the job control part 312 for controlling a job transmitted from the PC client 103 is not started here. Consequently, when "NO" is given in S602 and the process is thus advanced to S605, since the job control part 312 is not started, the external image processing controller 101 is in the state not accepting the process to be performed in cooperation with the image forming apparatus 102 (for example, the print instruction from the PC client 103).

Thus, as described in the flow chart of FIG. 6, when the start instruction is received by the external image processing controller 101 from the external device in the first power state, the external image processing controller 101 is started, and also a first start process of issuing the start instruction to the image forming apparatus is performed. On the other hand, when the start instruction is issued by the main power supply switch 208, the external image processing controller 101 is started, and also a second start process of not issuing the start instruction to the image forming apparatus is performed.

Next, a process which is performed when the start instruction packet is received by the CPU 201 from the PC client while the main power supply of the external image processing controller 101 is being on will be described with reference to FIG. 7.

Figure 7:
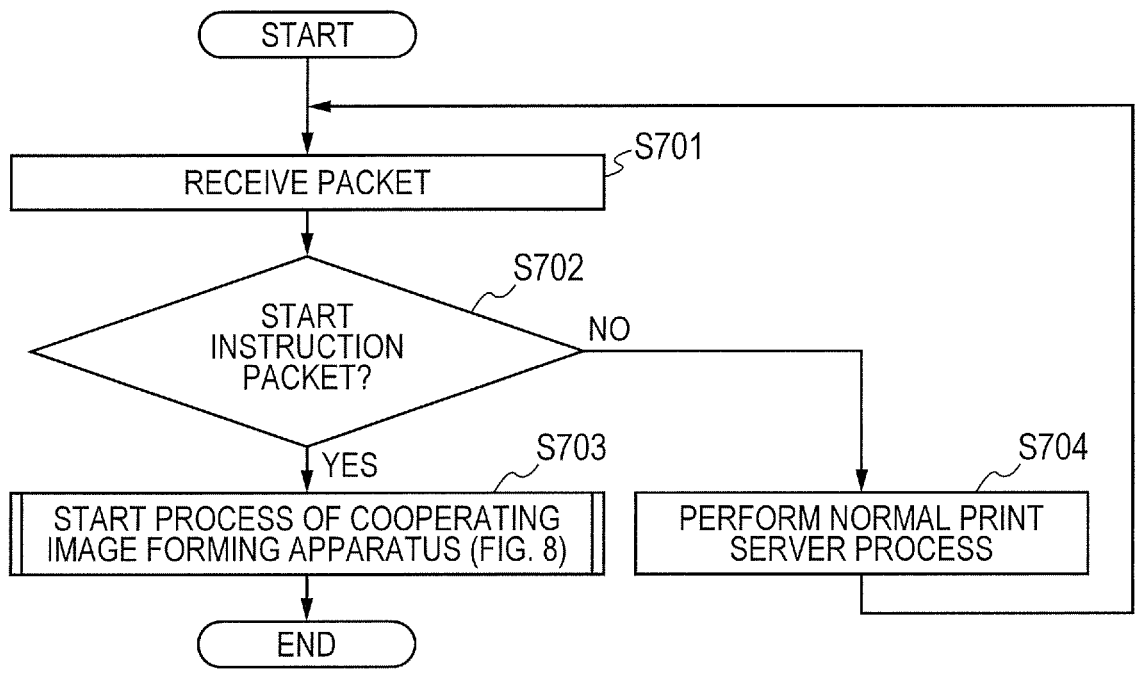

Namely, FIG. 7 is the flow chart indicating an example of the process which is performed when the start instruction packet is received from the PC client while the main power supply of software to be executed by the CPU 201 of the external image processing controller 101 is being on.

Incidentally, the process in the flow chart is achieved when the CPU 201 reads out and executes a program stored in the ROM 202, the RAM 203 or the HDD 204. Further, the process in this flow chart is performed to issue the start instruction from the external PC client 103 to the image forming apparatus 102 in the case where only the external image processing controller 101 is being started and activated and the image forming apparatus 102 is being stopped.

Initially, when the packet received by the LAN I/F 1 (212) is transferred from the LAN I/F 1 (212) to the CPU 201 (S701), the process is advanced to S702.

In S702, it is judged by the CPU 201 whether or not the packet received in S701 is the start instruction packet transmitted from the PC client 103.

When it is judged by the CPU 201 that the received packet is the start instruction packet transmitted from the PC client 103 (YES in S702), the process is advanced to S703.

In S703, the start process of the cooperating image forming apparatus 102 is performed based on the cooperation part 314 of the print server application by the CPU 201. The detail of this process will be separately described with reference to FIG. 8. When the process in S703 is completed, the entire process in this flow chart is completed by the CPU 201.

On the other hand, when it is judged by the CPU 201 in S702 that the packet received in S701 is not the start instruction packet transmitted from the PC client 103 (NO in S702), the process is advanced to S704.

In S704, the process (normal print server process) corresponding to the received packet is performed based on the process parts other than the cooperation part 314 of the print server application 301 by the CPU 201. Then, the process is again returned to S701 to receive a new packet.

Subsequently, the start process (S603 in FIG. 6, S703 in FIG. 7) of the cooperating image forming apparatus to be performed by the CPU 201 of the external image processing controller 101 will be described with reference to FIG. 8.

Figure 8:
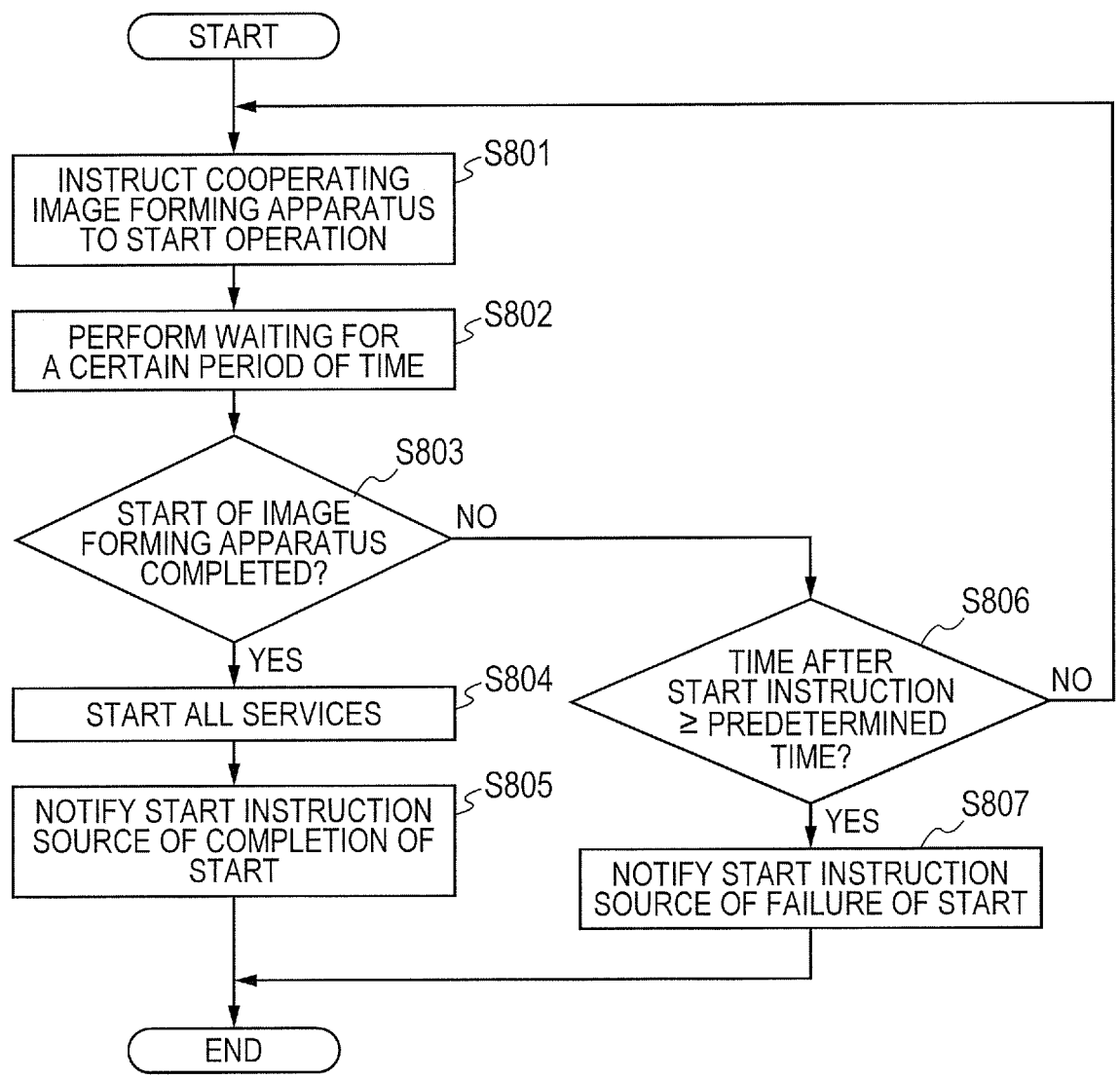
FIG. 8 is a flow chart indicating details of a start process of the image forming apparatus to be performed by the CPU 201 of the external image processing controller 101 cooperating with the image forming apparatus.

Namely, FIG. 8 is the flow chart indicating the details of the start process (S603 in FIG. 6, S703 in FIG. 7) of the cooperating image forming apparatus to be performed by the CPU 201 of the external image processing controller 101. Incidentally, the process in this flow chart corresponds to the process of the cooperation part 314. That is, this process is achieved when the CPU 201 reads out and executes a program stored in the storage unit of the ROM 202, the RAM 203 or the HDD 204 of the external image processing controller 101.

Initially, the cooperating image forming apparatus 102 is instructed by the CPU 201 to start the operation (S801). More specifically, the start instruction packet is transmitted by the CPU 201 from the LAN I/F 2 (213) to the image forming apparatus 102 through the network 105.

Next, a waiting process is performed for a certain period of time (or a predetermined time) by the CPU 201 (S802). This is because, in the image forming apparatus 102, a start process time for a few seconds to minutes is necessary from the reception of the start instruction in S801 to completion of the start. More specifically, the certain period of time of 10 to 30 seconds is set as the waiting time based on the time necessary to normally start the cooperating image forming apparatus, and the like.

Next, the CPU 201 judges through the LAN I/F 2 (213) whether or not the start of the cooperating image forming apparatus 102 has been completed (S803). More specifically, the CPU 201 judges and confirms the start by performing communication from the LAN I/F 2 (213) to the image forming apparatus 102. When it is judged that the start of the image forming apparatus 102 has been completed, a start condition is returned to the external image processing controller 101 in accordance with such a start confirmation.

When a notification of the start completion is received from the image forming apparatus 102, it is judged by the CPU 201 that the start of the image forming apparatus 102 has been completed (YES in S803), the process is advanced to S804.

Next, in S804, since the start of the image forming apparatus 102 has been completed and thus the image forming process can be performed, the initialization and start process is performed by the CPU 201 to the job control part 312 which was not started in S605 of FIG. 6, and all the services of the external image processing controller 101 are started. By the above process, since the job control part 312 is started, the external image processing controller 101 can accept the process (e.g., the print instruction from the PC client 103) which is performed in cooperation with the image forming apparatus 102. Then, the process is advanced to S805 by the CPU 201.

In S805, the CPU 201 notifies the start instruction source of the completion of the start, through the LAN I/F 1 (212). Here, the start instruction source is identified by using the value of the start instruction PC client IP 502 (FIG. 5) stored in the memory of the LAN I/F (212). Besides, to notify the start instruction source of the completion of the start, an SNMP (Simple Network Management Protocol) trap which is general as a network monitoring method, a TCP/IP (Transmission Control Protocol/Internet Protocol) communication from the external image processing controller 101, or the like is used. By such a method, the CPU 201 performs the notification to the image forming apparatus management tool operating in the PC client 103. Then, the process in this flow chart is completed by the CPU 201.

As illustrated in FIGS. 6 to 8, it is possible under the control of the CPU 201 not to accept the process to be performed in cooperation with the image forming apparatus 102 until the start of the image forming apparatus 102, but to accept the process to be performed in cooperation with the image forming apparatus 102 after the start of the image forming apparatus 102.

Incidentally, although only one IP address is recorded as the start instruction PC client IP 502 in FIG. 5, the record contents illustrated in FIG. 5 may be expanded. More specifically, a plurality of start instruction PC client IPs may be recorded so as to be able to notify a plurality of PC clients (not illustrated) of start probability in regard to start instructions therefrom.

On the other hand, in S803, when the notification of the start completion is not received from the image forming apparatus 102, it is judged by the CPU 201 that the start of the image forming apparatus is not completed (NO in S803), and the process is advanced to S806. Incidentally, as the case where the notification of the start completion is not received from the image forming apparatus 102, for example, some kind or another reason is conceivable, that is, a case where the power supply plug 907 has come out of the image forming apparatus 102, a case where the body power supply switch 908 is being off, a case where the image forming apparatus itself has been broken down, or the like. In this case, since the image forming apparatus 102 cannot be started for the above reason, it is impossible for this apparatus to respond to the communication from the LAN I/F 2 (213).

In S806, it is judged by the CPU 201 whether or not the certain period of time (predetermined time) has elapsed after the start instruction in S801 to the image forming apparatus 102. Here, as described in S802, a time 5 to 10 times longer than the time to the completion of the normal start is set as the certain period of time. More specifically, a time which is selected from the range of about 2 to 10 minutes is set.

When it is judged that the certain period of time does not elapse (NO in S806), there is a case where the start instruction in S801 does not reach the image forming apparatus 102 for some kind or another reason. Consequently, the process is returned to S801 by the CPU 201 to again issue the start instruction.

On the other hand, when it is judged that the certain period of time has already elapsed (YES in S806), it is judged by the CPU 201 that the image forming apparatus 102 cannot start the operation due to some kind or another failure, and the process is advanced to S807.

In S807, the CPU 201 judges that it fails in the start of the cooperating image forming apparatus 102, and thus notifies the start instruction source of the failure of the start (start failure notification) through the LAN I/F 1 (212). Incidentally, it should be noted that such notification is performed by the method same as that described in the step of S805. Then, the process in this flow chart is completed by the CPU 201.

As just described, it is possible to achieve the start of only the external image processing controller 101 by automatically discriminating the user's operation, that is, whether the start instruction has been issued through the network or by the user's depression of the main power supply button. Further, as in the above process advanced from S602 to S605 in FIG. 6, in the state that the start of the cooperating image forming apparatus 102 is not completed, the job control part 312 which cannot be used in this state is not started (that is, the stopping state of this part is maintained), and the state that the external image processing controller 101 does not accept the print instruction from the PC client 103 is set. Thus, it is possible to effectively prevent that the print job is erroneously given to the image forming apparatus in the nonprintable state like this.

As described above, according to the present embodiment, it is possible to start only the external image processing controller 101 without starting the image forming apparatus 102 by automatically discriminating the user's operation (i.e., the start instruction from the PC client 103, the turn-on of the main power supply switch 208 of the external image processing controller 101).

More specifically, in a case where a user wishes to start, by the conventional technique, the whole image processing system such as an image forming system established in a computer room of an office or a school, the user can start the whole image processing system including the image forming function by the start instruction (e.g., remote on) from the PC client 103. Besides, in a case where the user wishes to start only the external image processing controller 101 in such an environment as a design laboratory in which the system is mostly used only for typesetting edit, it is possible to start only the external image processing controller 101 by depressing the main power supply switch 208 of the external image processing controller 101.

Therefore, it is possible to achieve both the linkage start and the individual start for the external image processing controller and the image forming apparatus which make the image processing system capable of achieving the cooperative image process.

More specifically, in the image processing system in which the external image processing controller 101 and the image forming apparatus 102 are provided to cooperate, even in the case where the starts of both the external image processing controller and the image forming apparatus are linked together, it is possible to start and use only the necessary portion by turning on the power supply of only the external image processing controller 101. Thus, it is possible to reduce wasteful power consumption and thus achieve further power saving.

Incidentally, in a case where both the external image processing controller 101 and the image forming apparatus 102 have been started and the main power supply switch 208 of the external image processing controller 101 is turned off, the CPU 201 of the external image processing controller 101 may bring the state of the external image processing controller 101 to the power saving state and also bring the mode of the image forming apparatus 102 to the deep sleep mode.

Further, in addition to the body power supply switch 908, a not-illustrated main power supply switch may be provided on the image forming apparatus 102. In such a case, since the power supply control unit 905 of the image forming apparatus 102 is connected to the main power supply switch (not illustrated) through a main power supply switch line (not illustrated), it is possible to detect whether or not the main power supply switch is depressed by a user through the main power supply switch line. Then, the power supply control unit 905 causes the power supply unit 906 to activate power supply to the main power supply line 923 using the power supply unit control line 921, on the basis of detection of the depression of the main power supply switch.

In a case where both the image forming apparatus 102 having the constitution like this and the external image processing controller 101 are not started and the main power supply switch (not illustrated) of the image forming apparatus 102 is turned on, the image forming apparatus 102 may be started alone.

Incidentally, various data formations and contents of the present embodiment are not limited to those described above. Namely, it is needless to say that further various data formations and contents are achieved according to various uses and purposes.

Although the present embodiment has been exemplarily described as above, the present invention can be provided with, for example, other embodiments of a system, an apparatus, a method, a program, a storage medium and the like. More specifically, the present invention may be applied to a system which is made by a plurality of devices or to an apparatus which is made by a single device.

Moreover, a constitution which is obtained by combining the constitutions of the above embodiments is also included in the present invention.

Moreover, it should be noted that the present invention is not limited the control scheme of the above embodiment that, when the start instruction packet is received by the external image processing controller 101 through the network, the image forming apparatus 102 is linked and started, and, when the main power supply switch 208 of the external image processing controller 101 is turned on, the image forming apparatus 102 is not linked.

For example, when the unicast packet is used as the start instruction packet, the image forming apparatus 102 may be linked and started, and, when the broadcast packet or the multicast packet is used as the start instruction packet, the image forming apparatus 102 may not be linked.

Moreover, in the above embodiment, the image forming apparatus 102 is connected to the network through the external image processing controller 101. However, the present invention is not limited to this configuration. Namely, the image forming apparatus 102 may be connected to the network directly.

Other Embodiments

Moreover, the present invention can also be realized by performing a process of supplying software (programs) for realizing the functions of the above embodiment to a system or an apparatus through a network or various storage media and causing a computer (such as a CPU or an MPU) of the system or the apparatus to read out and execute the supplied programs.

Moreover, the present invention may be applied to a system consisting of a plurality of devices or to an apparatus consisting of a single device.

The present invention is not limited to the above embodiment, and various modifications (including organic combinations of respective embodiments) are possible based on the purport of the present invention. Namely, these modifications are not eliminated from the scope of the present invention, and a constitution which is obtained by combining the above embodiment and its modification is entirely included in the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-136757, filed Jun. 18, 2012, which is hereby incorporated by reference herein in its entirety.

What is claimed is:

1. A system including an image forming apparatus which performs printing based on image data, and an image processing control server which is externally connected with the image forming apparatus, generates the image data, and transmits the generated image data to the image forming apparatus, wherein the image forming apparatus comprises:
 a controller which controls the image forming apparatus;
 a first interface which communicates with the image processing control server; and
 a first power controller which controls the image forming apparatus to be operated in each of a plurality of power states including at least a first power state in which power is not supplied to the controller and power is supplied to the first interface, and a second power state in which power is supplied to the controller, wherein the image processing control server comprises:
 a second power controller which controls the image processing control server to be operated in each of a plurality of power states including at least a third power state and a fourth state of which a power consumption is larger than a power consumption of the third power state;
 a second interface which communicates with an external device via a network; and
 a third interface which is an interface different from the second interface, and is used for externally communicating with the image forming apparatus, and wherein, when the image processing control server is operated in the third power state, triggered by receiving predetermined data from the external device via the second interface, the second power controller shifts the operation of the image processing control server from the third power state to the fourth power state, and triggered by receiving the predetermined data from the external device by the second interface, the third interface transmits an instruction packet to the image forming apparatus which is externally connected to the image processing control server, the instruction packet being for shifting the operation of the image forming apparatus from the first power state to the second power state, and wherein the first power controller shifts the operation of the image forming apparatus from the first power state to the second power state, according to reception of the instruction packet by the first interface from the image processing control server, when the image forming apparatus is in the first power state.

2. The system according to claim 1, wherein the second interface transmits a start instruction to the second power controller according to the reception of the predetermined data by the second interface, and the second power controller shifts the operation of the image processing control server from the third power state to the fourth power state according to the reception of the instruction packet by the second power controller.

3. The system according to claim 1, wherein the second interface stores predetermined information according to the reception of the predetermined data by the second interface, and deletes the predetermined information after the third interface transmits the start instruction packet.

4. The system according to claim 3, wherein the second interface stores an IP address of the external device according to the reception of the predetermined data by the second interface.

5. The system according to claim 3, wherein the image processing control server further comprises a processor which provides the third interface with an instruction for transmitting the instruction packet based on the predetermined information being stored, and the third interface transmits the instruction packet to the image forming apparatus in accordance with the instruction of the processor.

6. The system according to claim 1, wherein the image processing control server further comprises a switch which receives a user operation, and the second power controller shifts the image processing control server from the first power state to the second power state according to the reception of the user operation by the switch when the image processing control server is in the first power state.

7. The system according to claim 6, wherein the third interface does not transmit the instruction packet to the image forming apparatus according to the reception of the user operation by the switch.

8. The system according to claim 1, wherein the first interface transmits a first completion notice to the image processing control server based on the image forming apparatus shifting in the operation from the first power state to the second power state, and the second interface transmits a second completion notice to the external device based on the third interface receiving the first completion notice.

9. The system according to claim 8, wherein the second interface transmits an error notice to the external device based on the third interface not receiving the first completion notice within a predetermined duration after the third interface transmits the instruction packet.

10. The system according to claim 1, wherein the first interface and the third interface comprise a Local Area Network interface.

11. The system according to claim 1, wherein the first interface and the third interface comprise a USB interface.

12. The system according to claim 1, wherein the predetermined data comprises a unicast packet.

13. The system according to claim 1, wherein the image forming apparatus further comprises a switch which receives a user operation, and the first power controller shifts the operation of the image forming apparatus from the first power state to the second power state according to the reception of the user operation by the switch when the image forming apparatus is in the first power state.

14. The system according to claim 1, wherein the image forming apparatus further comprises a printing unit and a reading unit.

15. The system according to claim 14, wherein the controller controls the printing unit and the reading unit.

16. An image processing control server which is externally connected with an image forming apparatus, generates image data, and transmits the generated image data to the image forming apparatus, wherein the image forming apparatus performs printing based on the image data, and comprises:

a controller which controls the image forming apparatus;
a first interface which communicates with the image processing control server; and
a first power controller which controls the image forming apparatus to be operated in each of a plurality of power states including at least a first power state in which power is not supplied to the controller and power is supplied to the first interface, and a second power state in which power is supplied to the controller,
wherein the image processing control server comprises:
a second power controller which controls the image processing control server to be operated in each of a plurality of power states including at least a third power state and a fourth power state of which power consumption is larger than a power consumption of the third power state;
a second interface which communicates with an external device; and
a third interface which is an interface different from the second interface, and is used for communicating with the image forming apparatus, and
wherein, when the image processing control server is operated in the third power state, triggered by receiving predetermined data from the external device via the second interface, the second power controller shifts the operation of the image processing control server from the third power state to the fourth power state, and triggered by receiving the predetermined data from the external device by the second interface, the third interface transmits an instruction packet to the image forming apparatus, the instruction packet being for shifting the operation of the image forming apparatus from the first power state to the second power state, and
wherein the first power controller shifts the image forming apparatus from the first power state to the second state, according to reception of the instruction packet by the first interface from the image processing control server, when the image forming apparatus is in the first power state.

17. The image processing control server according to claim 16, wherein the second interface transmits a start instruction to the second power controller according to the reception of the predetermined data by the second interface, and the second power controller shifts the operation of the image processing control server from the third power state to the fourth power state according to the reception of the instruction packet by the second power controller.

18. The image processing control server according to claim 16, wherein the second interface stores predetermined information according to the reception of the predetermined data by the second interface, and deletes the predetermined information after the third interface transmits the instruction packet.

19. The image processing control server according to claim 18, further comprising a processor which provides the third interface with an instruction for transmitting the instruction packet based on the predetermined information being stored, wherein the third interface transmits the instruction packet to the image forming apparatus in accordance with the instruction of the processor.

20. The image processing control server according to claim 16, further comprising a switch which receives a user operation, wherein the second power controller shifts the image processing control server from the first power state to the second power state according to the reception of the user operation by the switch when the image processing control server is in the first power state.

21. The image processing control server according to claim 20, wherein the third interface does not transmit the instruction packet to the image forming apparatus according to the reception of the user operation.

22. The image processing control server according to claim 16, wherein the first interface transmits a first completion notice to the image processing control server based on the image forming apparatus shifting in the operation from the first power state to the second power state, and the second interface transmits a second completion notice to the external device based on the third interface receiving the first completion notice.

23. The image processing control server according to claim 22, wherein the second interface stores an IP address of the external device according to the reception of the predetermined data by the second interface.

24. The image processing control server according to claim 22, wherein the second interface transmits an error notice to the external device based on the third interface not receiving the completion notice within a predetermined duration after the third interface transmits the instruction packet.

25. The image processing control server according to claim 16, wherein the third interface comprises a Local Area Network interface.

26. The image processing control server according to claim 16, wherein the third interface comprises a USB interface.

27. The image processing control server according to claim 16, wherein the predetermined data comprises a unicast packet.

28. The image processing control server according to claim 16, wherein the image forming apparatus further comprises a printing unit and a reading unit, and the controller controls the printing unit and the reading unit.

* * * * *